April 23, 1957 C. E. DREW 2,789,825
EXPANDING MANDREL CHUCK
Filed Oct. 6, 1954
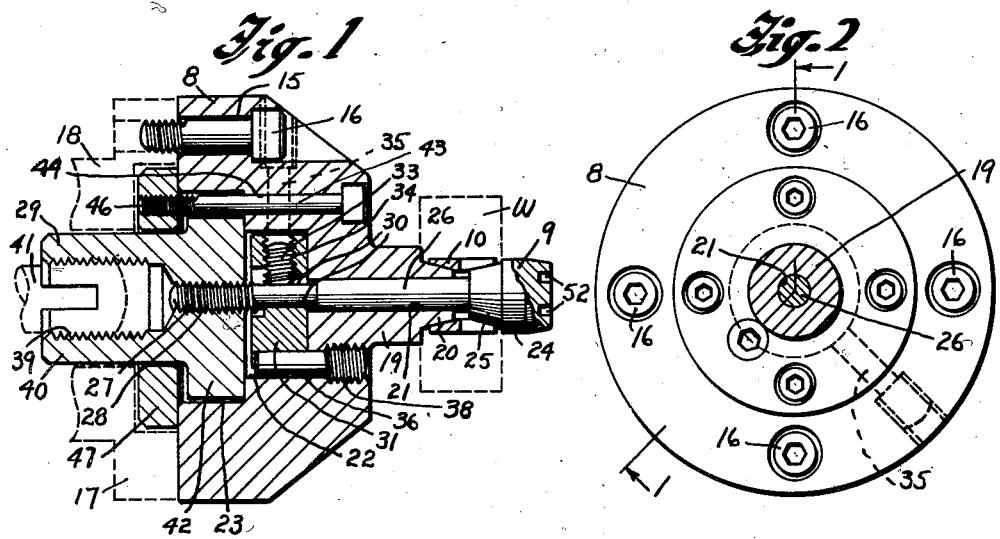
INVENTOR.
Charles E. Drew
BY Louis O. French
Att'y.

United States Patent Office 2,789,825
Patented Apr. 23, 1957

2,789,825

EXPANDING MANDREL CHUCK

Charles E. Drew, Racine, Wis.

Application October 6, 1954, Serial No. 460,696

8 Claims. (Cl. 279—2)

The invention relates to expanding type mandrel chucks of the face plate mounting type.

In some forms of chucks of the type mentioned a so-called drawpin is used to expand the mandrel, and sometimes there is a tendency of the cutter, acting on the work, to rotate the mandrel and through it rotate said drawpin which is highly objectionable as such rotation may throw out the mandrel adjustment and also cause wear on the pin whose dimensions must be held within close tolerances. The main object of the invention is to provide a simple and effective means which while permitting axial movement of the mandrel expander drawpin will firmly lock the drawpin against turning under sudden heavy loads imparted to it through the mandrel and thus prevent the mandrel itself from slipping or turning.

The invention further consists in the several features hereinafter described and more particularly defined by claims at the conclusion hereof.

In the drawings:

Fig. 1 is a vertical sectional view of a mandrel chuck embodying the invention, the section being taken on the broken line 1—1 of Fig. 2;

Fig. 2 is a front view of the chucking mandrel, parts being shown in section;

Fig. 3 is a vertical sectional view through an expanding mandrel or work holding sleeve;

Fig. 4 is a detailed rear end view of one of the parts shown in Fig. 1 and a cooperative part shown in section;

Fig. 5 is a front end view of the drawbar connector shown in Fig. 1;

Fig. 6 is a sectional view similar to Fig. 1 showing certain modifications with other parts shown in Fig. 1 omitted;

Fig. 7 is a view similar to Fig. 4 showing parts of the modified form.

Referring to Fig. 1 of the drawings, the chuck includes cooperative members 8 and 9 adapted to expand and hold between them an expanding sleeve type mandrel 10 of known form having conically faced ends 11 and 12 and slots 13 extending inwardly from said ends. Mandrel 10, on being expanded, engages a bore in the work piece W to hold it in position on the chuck.

For operating on the work piece, the chuck must be rotated by connection with some kind of rotating drive member, such as a face plate connected with the drive spindle of a lathe, milling machine, gear shaper, or other machine tool. As illustrative of one form of driving connection, I show the base of the member 8 provided with equidistantly circumferentially spaced holes 15 for receiving cap screws 16 which clamp said plate to the flanged portion 17 of a face plate 18.

The member 8 has a forwardly projecting spindle portion 19 provided with a centrally disposed conical end portion 20 to engage the conical end 11 of the mandrel 10 and is provided with axially alined differential diameter bores 21, 22, and 23.

The member 9 is the mandrel expander drawpin and has an exteriorly disposed head 24 provided with a conical surface 25 to engage the conical end 12 of the mandrel sleeve and with a cylindrical shank 26 slidably mounted in the bore 21 and having a threaded end 27 adjustably mounted in the threaded bore 28 of a drawbar connector or coupling member 29. Back of the threads 27 and in the region of the bore 22, the reduced diameter portion of the shank 26 is provided with diametrically disposed flats 30.

A torsion preventing member or collar 31 is mounted in the bore 22 and has an axial hole provided with a flat surface 32 to engage one of the flats 30 when the other flat 30 is engaged by an Allen-head set screw 33 mounted in a diametrically disposed threaded bore 34 in member 31. The set screw 33 is accessible for adjustment by a wrench through a radially disposed hole 35 in member 8 so that the locking member 31 may be firmly clamped to the drawpin in an axially alined position. The member 31 is locked against rotation relative to the member 8 by the engagement of a locking pin 36 in any one of a series of radially disposed circumferentially spaced pin engaging notches 37 in the periphery of the member 31. The pin 36 is mounted in a radially offset hole 38 in member 8 which is threaded to engage the threaded end of the pin which has the usual Allen head recess.

The drawbar connector 29 has a threaded bore 39 in its shank 40 to receive the threaded end of a drawbar 41, and its flanged head end 42 is mounted for a limited amount of lengthwise sliding movement in the bore 23, said head having the centrally disposed threaded bore 28 mentioned above. The connector 29 is held against rotation by a series of equidistantly circumferentially spaced cap screws 43 mounted in axially offset bores 44 in member 8 and extending through spaced notches 45 in the periphery of the head 42 and having their threaded ends 46 anchored in a ring 47 abutting a portion of the back face of the member 8.

As shown in Figs. 6 and 7, a member 8a similar to the member 8 has concentric differential bores 21a, 22a, and 23a corresponding to the bores 21, 22, and 23 and has a key slot 48 communicating with the bore 22a and a threaded bore 49 communicating with said slot. The drawbar pin 9 is identical with that of the first form and is similarly clamped at its flat sided portion to a torsion resisting member or collar 31a similar to the member 31 except that the peripheral notches 37a are of flat sided form, any one of which may be engaged by a key 50 slidably mounted in the key slot 48 and held in an operative position by an Allen head set screw 51 mounted in the bore 49 and adjustable from outside of the member 8a.

With the above constructions, the member 8 with the drawbar connector 40 mounted thereto and the locking member 31 or 31a loosely mounted in the bore 22 or 22a is clamped in centered position on the face plate or drive member 18. The mandrel 10 is then centered at its end 11 against the end portion 20 of member 8 and the drawpin 8 is then run through the mandrel, the bores 21 or 21a, and the axial hole in member 31, its threaded end 27 screwed into the connetcor 40 until its conical surface 25 engages the conical end 12 of the mandrel, in which position the member 31 or 31a is clamped to the flats of the drawpin shank by tightening up the set screw 33 or 54. The work W is then slipped over the mandrel 10, and then the drawpin 9 by the use of a spanner wrench engaging in the holes 52 is turned with the member 31 or 31a to expand the mandrel 10 so the work W may be slipped onto it, and one of the notches 37 is in line with the hole 38 or one of the notches 37a is alined with the then disengaged key 50. Then the locking pin 36 is turned in to engage in its alined notch 37 or the set screw 51 is turned in to raise or move the key 50 into keyed engagement with its alined notch 37a. Then when the drawbar 41 is operated to move to the left as viewed in Fig. 1 by any suitable means, the connector 29 is moved to the left carrying the drawbar pin 9 with it to put an expanding pressure on mandrel 10 to firmly grip the work W while the machining or other operations on the work are taking place, and during these operations any torsional strains imposed on the drawpin 9 through sleeve or mandrel 10 are prevented from turning the drawbar pin by the firm connection of the member 31 or 31a with said pin and the locking of said member 31 or 31a against turning relative to the member 8 or 8a as above described, though the drawbar pin 9 and its associated member 31 or 31a are free to slide lengthwise relative to the member 9 to clamp or release the mandrel 10.

It is to be noted from Fig. 1 that the head 42 of the drawbar connector 29 working in the bore 23 has a limited amount of lengthwise sliding movement therein due to the fact that the ring 47 acts as a stop to limit the movement of said connector 29 and thereby prevents overtravel movement of the drawpin to prevent expanding the mandrel beyond its capacity when no work is in the mandrel.

I desire it to be understood that this invention is not to be limited to any particular form or arrangement of parts except in so far as such limitations are included in the claims.

What I claim as my invention is:

1. In a chuck, the combination of a member adapted for attachment to a rotary driver member and having an apertured tapered spindle, a drawpin having a tapered end and a shank slidably movable in the aperture of said spindle, an expanding chucking mandrel engaged by said tapered spindle and the tapered end of said pin, a drawbar connector having an adjustable threaded connection with the shank of said pin, a torsion resisting member connected to the shank of said drawpin to move therewith as a unit, and means for holding said torsion resisting member against rotation relative to said first named member.

2. In a chuck, the combination of a member adapted for attachment to a rotary driver member and having an apertured tapered spindle, a lengthwise adjustable drawpin having a tapered end and a shank slidably movable in the aperture of said spindle, an expanding chucking mandrel engaged by said tapered spindle and the tapered end of said pin, a torsion resisting collar secured to the shank of said pin against rotation relative thereto and having a plurality of peripherally disposed circumferentially spaced notches, said collar being mounted in a bore of said first named member, and a locking member mounted in said first named member and engageable with any one of said notches to prevent rotation of said collar and hence said drawpin relative to said first named member.

3. In a chuck, the combination of a member adapted for attachment to a rotary driver member and having an apertured tapered spindle, a drawpin having a tapered end and a shank slidably movable in the aperture of said spindle, an expanding chucking mandrel engaged by said tapered spindle and the tapered end of said pin, a drawbar, means for lengthwise adjustably connecting the shank of said pin to a drawbar, a torsion resisting collar secured to the shank of said pin against rotation relative thereto and having a plurality of peripherally disposed, circumferentially spaced notches, said collar being mounted in a bore of said first named member, and a locking pin adjustably mounted in said first named member for engaging any one of said notches to hold said collar and hence said drawpin against rotation relative to said first named member.

4. In a chuck, the combination of a member adapted for attachment to a rotary driver member and having an apertured tapered spindle, a lengthwise adjustable drawpin having a tapered end and a shank slidably movable in the aperture of said spindle, an expanding chucking mandrel engaged by said tapered spindle and the tapered end of said pin, a torsion resisting collar having a bore provided with a flat surface, a set screw in said collar movable into said bore toward said surface, the shank of said pin having oppositely disposed flats for engagement, respectively, with said flat surface and said set screw to lock said collar to said spindle, said collar being mounted in a bore of said first named member and having a plurality of peripherally disposed circumferentially spaced notches, and a locking member mounted in said first named member and engageable with any one of said notches alined therewith to hold said collar and hence said drawpin against rotation relative to said first named member.

5. In a chuck, the combination of a member adapted for attachment to a rotary driver member and having an apertured tapered spindle, a lengthwise adjustable drawpin having a tapered end and a shank slidably movable in the aperture of said spindle, an expanding chucking mandrel engaged by said tapered spindle and the tapered end of said pin, a torsion resisting means connected to the shank of said drawpin for initial sliding movement to bring the mandrel to a working position and adapted thereafter to be connected to said shank to move as a unit with said drawpin, and means for holding said torsion resisting means against rotation relative to said first named member.

6. In a chuck, the combination of a member adapted for attachment to a rotary driver member and having an apertured tapered spindle, a lengthwise adjustable drawpin having a tapered end and a shank slidably movable in the aperture of said spindle, an expanding chucking mandrel engaged by said tapered spindle and the tapered end of said pin, a torsion resisting member extending over a portion of the shank of said drawpin, means for preventing rotary movement of said member relative to said shank, and means for holding said member against rotation relative to said first member.

7. In a chuck, the combination of a member adapted for attachment to a rotary driver member and having an apertured tapered spindle, a drawpin having a tapered end and a shank slidably movable in the aperture of said spindle, an expanding chucking mandrel engaged by said tapered spindle and the tapered end of said pin, a drawbar connector having an adjustable threaded connection with the shank of said pin, a limit stop for said connector to prevent said drawpin expanding said mandrel beyond its capacity when no work is therein, a torsion resisting means mounted on the shank of said drawpin adjacent said drawbar connector to move therewith as a unit, and means for holding said torsion resisting means against rotation relative to said first named member.

8. In a chuck, the combination of a chuck member adapted for attachment to a rotary driven member and having an apertured tapered spindle, a lengthwise adjustable drawpin having a tapered end and a shank slidably movable in the aperture in said spindle, an expanding chucking mandrel engaged by said tapered spindle and the tapered end of said drawpin, and torsion resisting means permitting free lengthwise sliding movement of said shank relative to said chuck member but resisting its turning movement including a torsion resisting collar mounted on a portion of the shank of said drawpin rearwardly of said portion of the shank guided in said aperture.

References Cited in the file of this patent

UNITED STATES PATENTS

| | | |
|---|---|---|
| 2,348,819 | Johnson | May 16, 1944 |
| 2,373,907 | Olson | Apr. 17, 1945 |
| 2,435,480 | Tuttle | Feb. 3, 1948 |